(12) United States Patent
Jur et al.

(10) Patent No.: US 9,197,045 B2
(45) Date of Patent: Nov. 24, 2015

(54) BUSWAY JOINT STRUCTURAL SUPPORT ASSEMBLIES AND RELATED SYSTEMS

(71) Applicant: Eaton Corporation, Cleveland, OH (US)

(72) Inventors: Arthur James Jur, Greenwood, SC (US); David Ladd Kelley, Greenwood, SC (US); John Michael Kokenda, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 135 days.

(21) Appl. No.: 13/936,579

(22) Filed: Jul. 8, 2013

(65) Prior Publication Data

US 2015/0008007 A1    Jan. 8, 2015

(51) Int. Cl.
*H02G 5/00*  (2006.01)
*H02G 3/04*  (2006.01)

(52) U.S. Cl.
CPC ........... *H02G 3/0418* (2013.01); *H02G 3/0462* (2013.01); *H02G 5/007* (2013.01)

(58) Field of Classification Search
CPC ........... H02G 5/00; H02G 5/007; H02G 5/02; H02G 5/025; H02G 5/06; H02G 3/14; H02G 3/06; H02G 3/0616; H02G 5/03; H02G 3/0462; H02G 3/0418; H05K 5/00; H05K 5/02; H05K 5/03
USPC ........ 174/68.2, 88 B, 72 B, 71 B, 70 B, 99 B, 174/66, 67; 439/212, 213; 361/611, 637, 361/648, 675
See application file for complete search history.

(56) References Cited

U.S. PATENT DOCUMENTS

| | | | | |
|---|---|---|---|---|
| 3,647,937 | A * | 3/1972 | Jorgensen | 174/88 B |
| 4,213,003 | A * | 7/1980 | Carlson | 174/88 B |
| 4,849,581 | A * | 7/1989 | Larkin et al. | 174/88 B |
| 4,979,906 | A | 12/1990 | Shrout et al. | |
| 5,785,542 | A * | 7/1998 | Johnson | 439/213 |
| 5,821,464 | A * | 10/1998 | Graham et al. | 174/88 B |
| 6,329,598 | B1 * | 12/2001 | M'Sadoques et al. | 174/68.2 |
| 6,870,103 | B1 * | 3/2005 | Wiant et al. | 174/68.2 |
| 8,900,002 | B2 * | 12/2014 | Mooney et al. | 439/212 |

FOREIGN PATENT DOCUMENTS

| | | |
|---|---|---|
| DE | 10 49 463 C2 | 1/1959 |
| EP | 0 624 941 A1 | 11/1994 |

OTHER PUBLICATIONS

International Search Report and Written Opinion Corresponding to International Application No. PCT/US2014/045582; Date of Mailing: Nov. 4, 2014; 8 Pages.

* cited by examiner

*Primary Examiner* — Angel R Estrada
(74) *Attorney, Agent, or Firm* — Myers Bigel Sibley & Sajovec, PA (57) ABSTRACT

A cover assembly for use with a joint between first and second busway sections includes: a lower cover sized and configured to be positioned below the joint; an upper cover sized and configured to be positioned above the joint; and a plurality of elongated fasteners. With the lower and upper covers in position, each fastener is sized and configured to extend through a respective pathway that extends through one of the first and second busway sections and is defined by aligned apertures of the upper cover and fastener receiving features of the lower cover to secure the upper and lower covers to the first and second busway sections.

21 Claims, 5 Drawing Sheets

BUSWAY JOINT STRUCTURAL SUPPORT ASSEMBLIES AND RELATED SYSTEMS

BACKGROUND

Underwriters Laboratories standard UL 857 provides five methods for structurally testing busway joints. Two of the five test methods require less strength in the joints than the other three test methods. Underwriters Laboratories has recently requested that these two less stringent methods not be used to test busway joints. As a result, additional structural strength is required in busway joint designs. In addition to providing the requisite strength, it is desirable for joint structural support assemblies to be relatively easy to install.

FIELD

The present invention is related to busway joints and, more specifically, to structural support assemblies for busway joints.

SUMMARY

Some embodiments of the invention are directed to a cover assembly for use with a joint between first and second busway sections. The assembly includes a lower cover, an upper cover and a plurality of elongated fasteners. The lower cover has a bottom wall including first and second end portions, with each of the first and second end portions including a pair of spaced-apart fastener receiving features. The lower cover is sized and configured to be positioned in a first position below the joint such that the first end portion of the bottom wall is positioned below a portion of the first busway section and the second end portion of the bottom wall is positioned below a portion of the second busway section. The upper cover has a top wall including first and second end portions, with each of the first and second end portions including a pair of spaced-apart apertures. The upper cover is sized and configured to be positioned in a first position above the joint such that the first end portion of the top wall is positioned above a portion of the first busway section and the second end portion of the top wall is positioned above a portion of the second busway section. With the lower and upper covers in their respective first positions, the apertures of the first end portion of the top wall are aligned with the fastener receiving features of the first end portion of the bottom wall, thereby forming first and second substantially vertical spaced-apart pathways that extend through the first busway section, and the apertures of the second end portion of the top wall are aligned with the fastener receiving features of the second end portion of the bottom wall, thereby forming first and second substantially vertical spaced-apart pathways that extend through the second busway section. Each elongated fastener is sized and configured to extend through a respective one of the pathways with the upper and lower covers in their respective first positions so as to secure the upper and lower covers to the first and second busway sections.

In some embodiments, the upper and lower covers are releasably connectable to one another when in their first positions. Each of the upper and lower covers may include a pair of opposed side walls, with each side wall of the upper cover releasably connectable with a respective side wall of the lower cover. The upper and lower covers may form a seal around the joint when connected to one another. Each side wall of the upper cover may extend outwardly away from the top wall with a rounded corner therebetween, and each side wall of the lower cover may extend outwardly away from the bottom wall with a rounded corner therebetween.

The assembly may include a plurality of supports. Each support may include at least one passageway. Each support may be sized and configured to be positioned adjacent one of the apertures of the upper cover top wall or one of the fastener receiving features of the lower cover bottom wall such that the at least one passageway forms a portion of a respective one of the pathways. The passageway(s) of each support may be threaded, and each elongated fastener may be configured to threadingly engage the passageway. Each support may include first and second spaced-apart passageways.

In some embodiments, each of the first and second busway sections includes a housing having first and second apertures. With the upper and lower covers in their respective first positions, the first and second apertures of the first busway section housing align with the first and second pathways extending through the first busway section, and the first and second apertures of the second busway section housing align with the first and second pathways extending through the second busway section.

In some embodiments, with the upper and lower covers in their first positions and the elongated fasteners extending through the passageways, the joint satisfies structural strength requirements under Underwriters Laboratories standard UL 857.

Some other embodiments of the invention are directed to a system including first and second busway sections forming a joint therebetween, a joint cover, and a plurality of elongated fasteners. The joint cover includes a first cover member having an end wall including first and second end portions, with the first cover member positioned on a first side of the joint. The joint cover further includes a second cover member having an end wall including first and second end portions, with the second cover member positioned on a second, opposite side of the joint. One elongated fastener extends through each of first and second pathways associated with the first busway section and formed through the first end portion of the first cover member, through the first busway section, and to the first end portion of the second cover member. One elongated fastener extends through each of first and second pathways associated with the second busway section and formed through the second end portion of the first cover member, through the second busway section, and to the second end portion of the second cover member.

In some embodiments, the first pathway associated with the first busway section is defined by a first aperture of the first end portion of the first cover member, a first aperture of a housing of the first busway section, and a first fastener receiving feature of the first end portion of the second cover member; the second pathway associated with the first busway section is defined by a second aperture of the first end portion of the first cover member, a second aperture of the housing of the first busway section, and a second fastener receiving feature of the first end portion of the second cover member; the first pathway associated with the second busway section is defined by a first aperture of the second end portion of the first cover member, a first aperture of a housing of the second busway section, and a first fastener receiving feature of the second end portion of the second cover member; and the second pathway associated with the second busway section is defined by a second aperture of the second end portion of the first cover member, a second aperture of the housing of the second busway section, and a second fastener receiving feature of the second end portion of the second cover member. Each of the first and second cover members may include a pair of side walls, with the first and second cover members connected at the side walls, and with the first and second cover members forming a seal around the joint.

Some other embodiments of the invention are directed to a system including first and second busway sections forming a joint therebetween, a joint cover, and a plurality of elongated fasteners. The joint cover includes an upper cover member having a top wall including first and second end portions, the upper cover being positioned above the joint such that the first end portion is positioned above the first busway section and the second end portion is positioned above the second busway section. The joint cover further includes a lower cover having a bottom wall including first and second end portions, the lower cover being positioned below the joint such that the first end portion is positioned below the first busway section and the second end portion is positioned below the second busway section. One elongated fastener extends through each of: first and second substantially vertical pathways associated with the first busway section and formed through the first end portion of the upper cover, through the first busway section, and to the first end portion of the lower cover; and first and second substantially vertical pathways associated with the second busway section and formed through the second end portion of the upper cover, through the second busway section, and to the second end portion of the lower cover.

In some embodiments, each of the first and second busway sections includes a housing, with each housing including first and second substantially horizontal upper flanges and first and second substantially horizontal lower flanges. In some embodiments, the first pathway associated with the first busway section extends through the first upper flange and the first lower flange of the first busway section housing; the second pathway associated with the first busway section extends through the second upper flange and the second lower flange of the first busway section housing; the first pathway associated with the second busway section extends through the first upper flange and the first lower flange of the second busway section housing; the second pathway associated with the second busway section extends through the second upper flange and the second lower flange of the second busway section housing.

In some embodiments, the first pathway associated with the first busway section is defined by aligned apertures in the first end portion of the top wall, the first upper flange and the first lower flange; the second pathway associated with the first busway section is defined by aligned apertures in the first end portion of the top wall, the second upper flange and the second lower flange; the first pathway associated with the second busway section is defined by aligned apertures in the second end portion of the top wall, the first upper flange and the first lower flange; and the second pathway associated with the second busway section is defined by aligned apertures in the second end portion of the top wall, the second upper flange and the second lower flange. In some embodiments, the first and second pathways associated with the first busway section are further defined by respective fastener receiving features in the first end portion of the bottom wall, and the first and second pathways associated the second busway section are further defined by respective fastener receiving features in the second end portion of the bottom wall. In some embodiments, the fastener receiving features are apertures.

The system may include a plurality of supports, one positioned between each of the upper flanges and the top wall and one positioned between each of the lower flanges and the bottom wall, with each of the supports including at least one passageway such that each pathway includes a passageway of two of the supports. Each of the supports may include first and second spaced-apart passageways, with the first passageway having right-handed threads and the second passageway having left-handed threads, and each of the elongated fasteners may threadingly engage one of the first or second passageways of two of the spacers as it extends through a respective pathway.

Each of the upper and lower covers may include a pair of opposed side walls, with the side walls of at least one of the upper and lower covers releasably connected to the first and second busway sections, and with the side walls of the upper and lower covers are releasably connected to one another. The side walls of at least one of the upper and lower covers may be releasably connected to opposing sides of the first and second busway sections. At least a portion of the side walls of one of the upper and lower covers may overlie at least a portion of the side walls of the other one of the upper and lower covers.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Figures 1, 2:
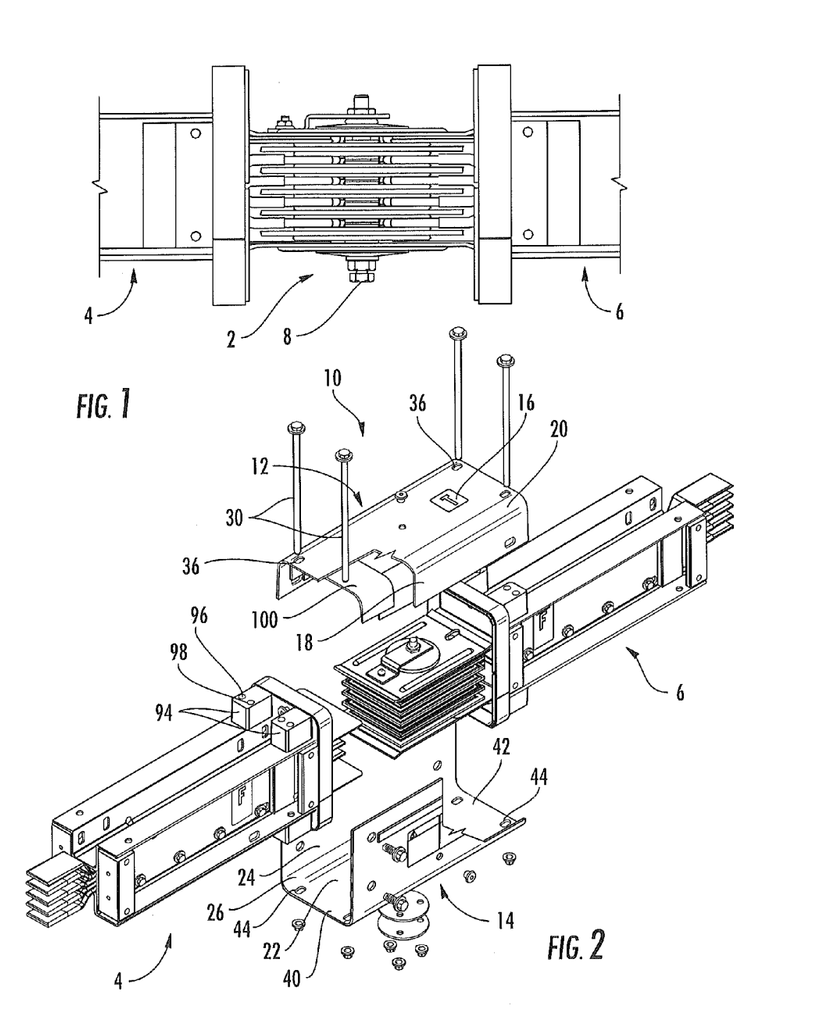
FIG. 1 is a side schematic illustration of a joint formed between two busway sections.
FIG. 2 is an exploded, perspective view of a busway joint cover assembly including upper and lower covers according to some embodiments of the invention.

Some embodiments of the present invention are directed to strength support members (e.g., covers) for use with joints between busway sections. An exemplary joint 2 is shown in FIG. 1, with the joint 2 formed between ends of first and second busway sections 4, 6. The ends of the busway sections 4, 6 include contact surfaces. Typically, the end of one of the first and second busway sections 4, 6 will have a joint installed (i.e., the joint end) and the end of the other one of the first and second busway sections 4, 6 is a conductor end. The busway sections 4, 6 are aligned and the conductor end is slid into the joint end such that the contact surfaces of the busway sections 4, 6 intermesh. The joint 2 is pulled together using a mechanism such as a joint puller, as is known to those of skill in the art. When the two busway sections 4, 6 have been properly joined together, one or more joint bolts 8 are tightened with proper installation torque.

After the joint bolt(s) is/are tightened with the proper torque, a joint cover may be installed. Joint covers prevent incidental contact with energized conductors and connect a portion of the housing ground path between the two sections of busway. In addition, the joint cover may provide structural support for the joint. Embodiments of the present invention are directed to joint covers that may provide increased structural support over known covers. The joint covers according to some embodiments of the present invention provide for busway joints that may be compliant with structural strength requirements of Underwriter Laboratories standard UL 857. Some embodiments of the present invention provide compliant joint covers that may be easier to install than known covers.

Figure 3:
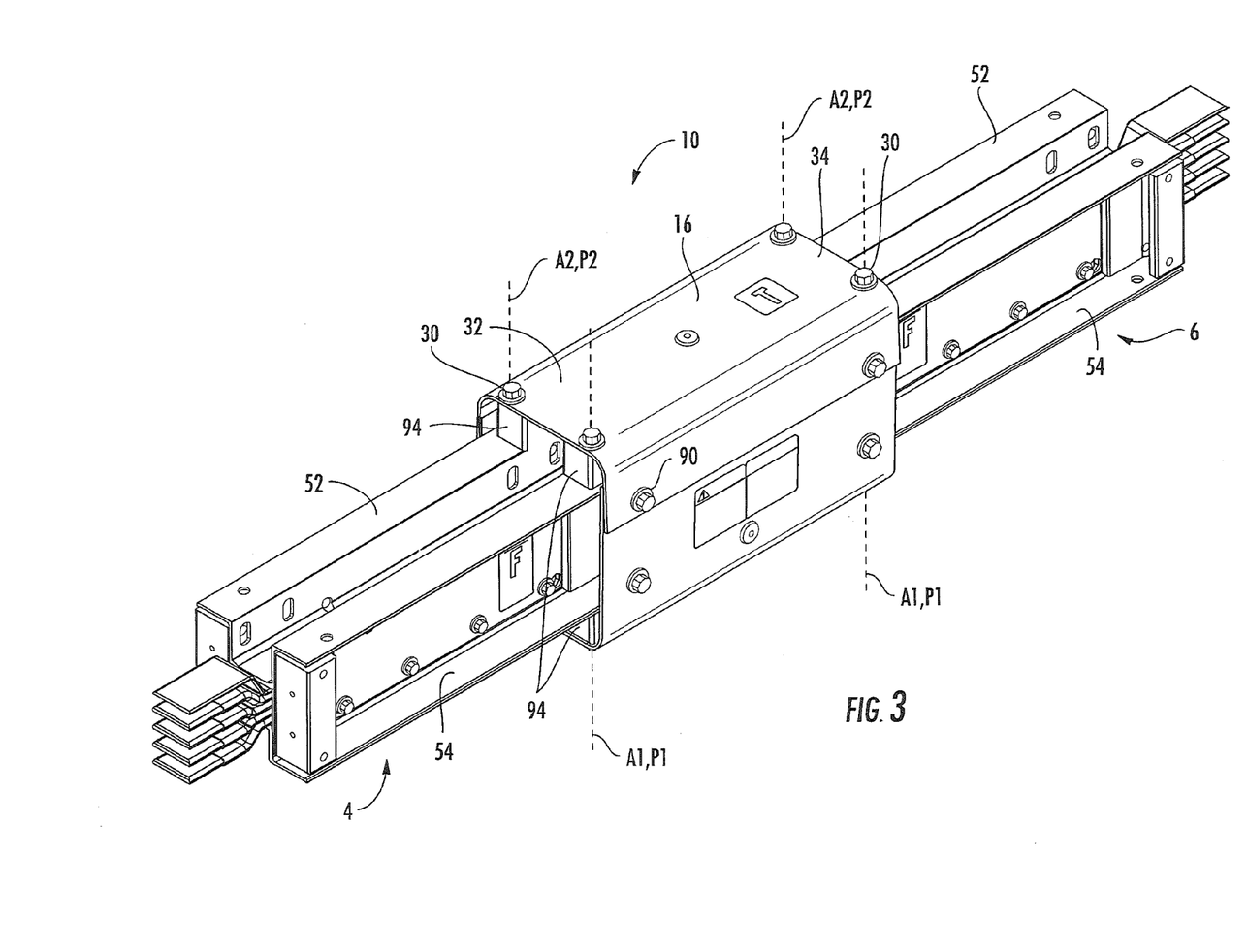
FIG. 3 is an assembled, perspective view of the busway joint cover assembly of FIG. 2 according to some embodiments of the invention.

A joint cover assembly 10 according to some embodiments of the invention is illustrated in FIGS. 2 and 3. The assembly 10 includes a first cover member 12 and a second cover member 14. The first cover member 12 includes an end wall 16 having first and second opposite end portions 32, 34. The second cover member 14 includes an end wall 22 having first and second end portions 40, 42. The first cover member 12 is sized and configured to be positioned on a first side of the joint such that the first end portion 32 is positioned adjacent or on a portion of the first busway section 4 and the second end portion 34 is positioned adjacent or on a portion of the second busway section 6. The second cover member 14 is sized and configured to be positioned on a second, opposite side of the joint such that the first end portion 40 is positioned adjacent or on a portion of the first busway section 4 and the second end portion 42 is positioned adjacent or on a portion of the second busway section 6.

For ease of description, the first cover member 12 will be referred to herein as an "upper cover" 12 having a "top wall" 16 and the second cover member 14 will be referred to herein as a "lower cover" 14 having a "bottom wall" 22 (i.e., the walls 16, 22 are generally horizontally disposed). However, it will be understood that the first and second cover members 12, 14 may positioned in different orientations. For example, although the busway sections 4, 6 are shown as extending horizontally in the figures, it is contemplated that the busway sections 4, 6 may extend vertically, and the walls 16, 22 may be generally vertically disposed. Similarly, the busway sections 4, 6 may be rotated about their longitudinal axis, for example about 90 degrees, and the walls 16, 22 may then be generally vertically disposed.

As illustrated in FIGS. 2 and 3, the upper cover 12 includes the top wall 16 and first and second opposed side walls 18. In some embodiments, and as illustrated, corners 20 between the top wall 16 and each of the side walls 18 are rounded to reduce stress at the corners 20.

The lower cover 14 includes the bottom wall 22 and first and second opposed side walls 24. In some embodiments, and as illustrated, corners 26 between the bottom wall 22 and each of the side walls 24 are rounded to reduce stress at the corners 26.

The upper and lower covers 12, 14 may be made of any suitable material. Exemplary suitable materials include aluminum and steel.

The assembly 10 includes a plurality of elongated fasteners 30 (e.g., bolts). As illustrated, each fastener 30 is sized and configured to extend substantially vertically through the upper cover 12, through one of the first and second busway sections 4, 6, and to, towards and/or through the lower cover 14, as will be described in greater detail below.

The upper cover top wall 16 includes first and second opposite end portions 32, 34. Each of the first and second end portions 32, 34 includes a pair of apertures 36 (e.g., bolt holes). Similarly, the lower cover bottom wall 22 includes first and second opposite end portions 40, 42. Each of the first and second end portions 40, 42 includes a pair of fastener receiving features 44. Each fastener receiving feature 44 may take a variety of forms, such as a blind nut, a boss or other protrusion having a passageway, or an aperture (e.g., bolt hole). For ease of discussion, the fastener receiving features 44 will be described herein as apertures (although it will be understood that the fastener receiving features may take other forms such as those just described).

Figure 4:
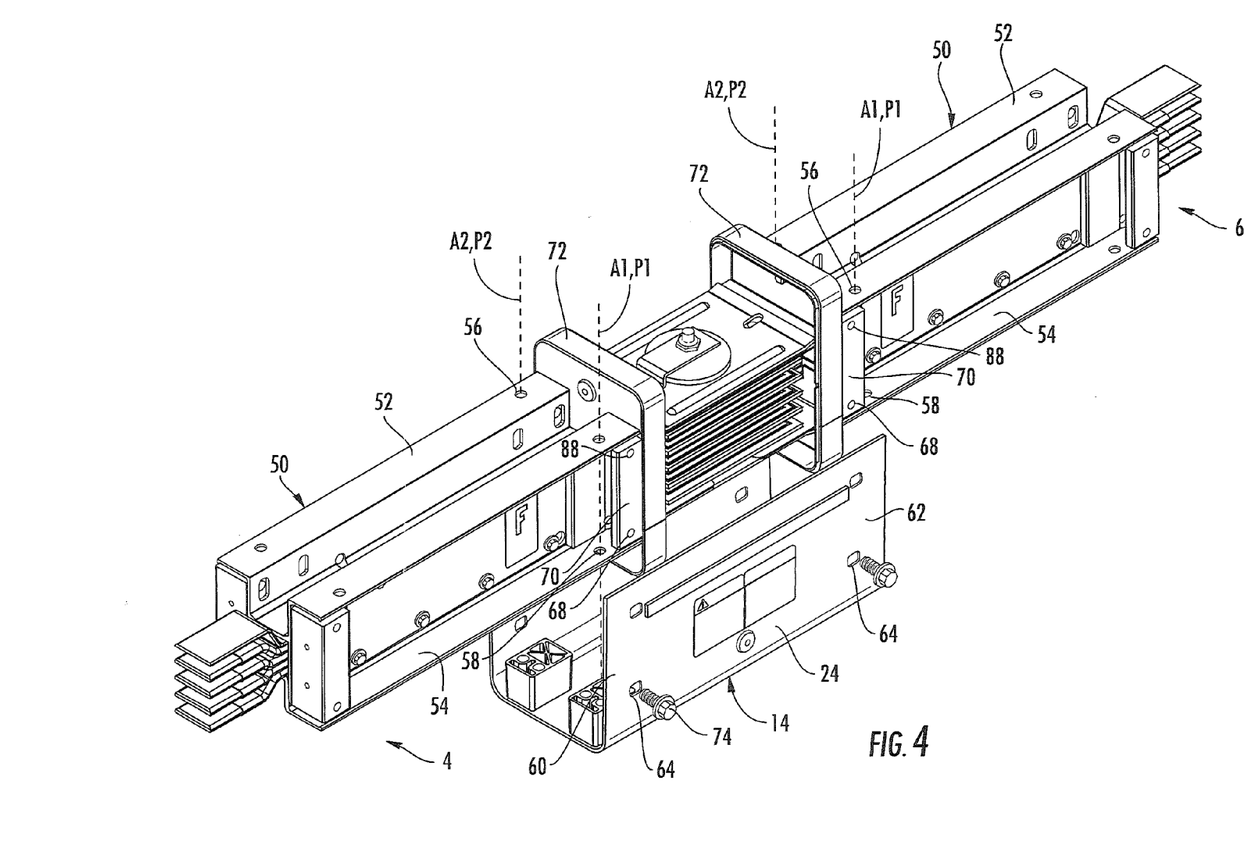
FIG. 4 is a perspective view illustrating the lower cover of FIG. 2 before being installed at a busway joint according to some embodiments of the invention.

Referring now to FIG. 4, the first busway section 4 includes a housing 50. The housing 50 includes a pair of upper flanges 52 and a pair of lower flanges 54. Each flange 52, 54 extends along at least a major portion of a length of the busway section 4 or the housing 50. As can be seen in FIG. 4, each upper flange 52 is aligned with a corresponding lower flange 54 (e.g., each upper flange 52 is disposed directly above the corresponding lower flange 54 with the busway section 4 in the orientation shown in FIG. 4). Each upper flange 52 includes an aperture 56 (e.g., bolt hole) and each lower flange 54 includes an aperture 58 (e.g., bolt hole), with the apertures 56, 58 of corresponding upper and lower flanges 52, 54 being aligned; that is, an axis A1 extends through one corresponding set of apertures 56, 58. Similarly, an axis A2 extends through the other corresponding set of apertures 56, 58. As will be described in more detail below, the elongated fasteners 30 (FIG. 2) are sized and configured to extend through the flanges 52, 54 along the axes A1 and A2.

Similarly, the second busway section 6 includes a housing 50 including a pair of upper flanges 52 and a pair of lower flanges 54. Each upper flange 52 includes an aperture 56 and each lower flange 54 includes an aperture 58, with the apertures 56, 58 of corresponding upper and lower flanges 52, 54 being aligned in the same manner described above in reference to the busway section 4. An axis A1 extends through one set of corresponding apertures 56, 58 and an axis A2 extends through the other set of corresponding apertures 56, 58.

Figure 5:
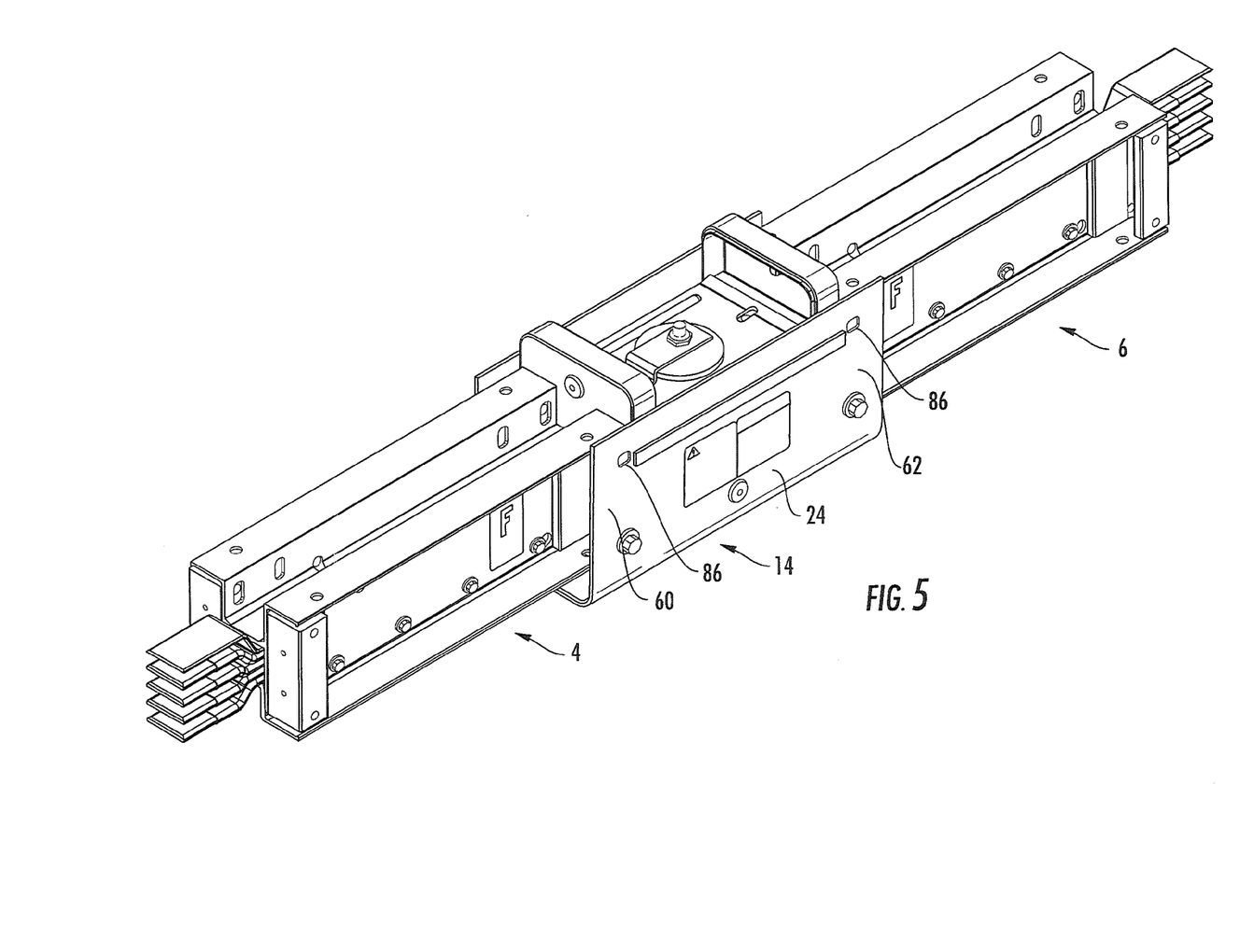
FIG. 5 is a perspective view illustrating the lower cover of FIG. 2 after being installed at a busway joint according to some embodiments of the invention.

The lower cover 14 is sized and configured to be positioned in a first position at the joint as shown in FIG. 5. In the first position, the lower cover bottom wall 22 (FIG. 2) is positioned below the joint formed between the first and second busway sections 4, 6. The first end portion 40 of the lower cover bottom wall 22 (FIG. 2) is positioned below a portion of the first busway section 4 and the second end portion 42 of the bottom wall 22 (FIG. 2) is positioned below a portion of the second busway section 6. With the lower cover 14 positioned in the first position shown in FIG. 5, each of the apertures 44 of the lower cover bottom wall first end portion 40 (FIG. 2) is aligned with one of the lower flange apertures 58 and its corresponding upper flange aperture 56 of the first busway section 4. As such, a pathway P1 extending from the one of the apertures 44 of the first end portion 40, through one of the lower flange apertures 58 and through the corresponding upper flange aperture 56 is formed, with the pathway P1 extending along the axis A1. A pathway P2 extending from the other one of the apertures 44 of the first end portion 40, through the other one of the lower flange apertures 58 and through the corresponding upper flange aperture 56 is formed, with the pathway P2 extending along axis A2 (FIG. 4).

Likewise, each of the apertures 44 of the lower cover bottom wall second end portion 42 (FIG. 2) is aligned with one of the lower flange apertures 58 and its corresponding upper flange aperture 56 of the second busway section 6. Pathways P1, P2 are formed with the aligned apertures in the same manner described above in reference to the lower cover bottom wall first end portion 40 and the first busway section 4 (FIG. 4).

In some embodiments, and as illustrated in FIGS. 4 and 5, the lower cover 14 is releasably attachable or connectable to the busway sections 4, 6 to hold the lower cover 14 in the first position. As shown in FIG. 4, each side wall 24 of the lower cover 14 includes first and second opposite end portions 60, 62. Each of the first and second end portions 60, 62 includes a first aperture 64. Each of the first and second busway sections 4, 6 includes an aperture or passageway 68 on opposite sides thereof (only one aperture 68 is visible for each of the busway sections 4, 6 in the view of FIG. 4). The apertures or passageways 68 may be positioned in end blocks 70 of the busway sections 4, 6. The end blocks 70 may be adjacent barrier plates 72 of the busway sections 4, 6.

With the lower cover 14 in the first position (FIG. 5), the apertures 64 of the lower cover side walls 24 are aligned with the apertures 68 of the first and second busway sections 4, 6. The lower cover 14 may then be releasably attached or connected to the first and second busway sections 4, 6, for example using fasteners 74 that extend through the apertures 64 of the lower cover side walls 24 and through or into the aligned apertures or passageways 68 of the first and second busway sections 4, 6.

The upper cover 12 is sized and configured to be positioned at the joint in a first position as shown in FIG. 3. In the first position, the upper cover top wall 16 is positioned above the joint formed between the first and second busway sections 4, 6. The first end portion 32 of the upper cover top wall 16 is positioned above a portion of the first busway section 4 and the second end portion 34 of the top wall 16 positioned above a portion of the second busway section 6. With the upper cover 12 positioned in the first position shown in FIG. 7, each of the apertures 36 of the upper cover top wall first end portion 32 (FIG. 2) is aligned with one of the upper flange apertures 56 and its corresponding lower flange aperture 58 of the first busway section 4 (FIG. 4). In this regard, the pathway P1 extends from the one of the apertures 36 of the top wall first end portion 32, through one of the upper flange apertures 56, through the corresponding lower flange aperture 58 and to, toward or through one of the apertures 44 of the bottom wall first end portion 40, with the pathway P1 extending along the axis A1. The pathway P2 extends from the other one of the apertures 36 of the top wall first end portion 32, through the other one of the upper flange apertures 56, through the corresponding lower flange aperture 58 and to, toward or through the other one of the apertures 44 of the bottom wall first end portion 40, with the pathway P2 extending along axis A2.

Likewise, with the top cover in the first position as shown in FIG. 3, each of the apertures 36 of the top wall second end portion 34 is aligned with one of the upper flange apertures 56 and its corresponding lower flange aperture 58 of the second busway section 6 and with one of the apertures 44 of the bottom wall second end portion 42 (FIGS. 2 and 4). Pathways P1, P2 are formed with the aligned apertures in the same manner described above in reference to the upper cover top wall first end portion 32 and the first busway section 4.

Figure 6:
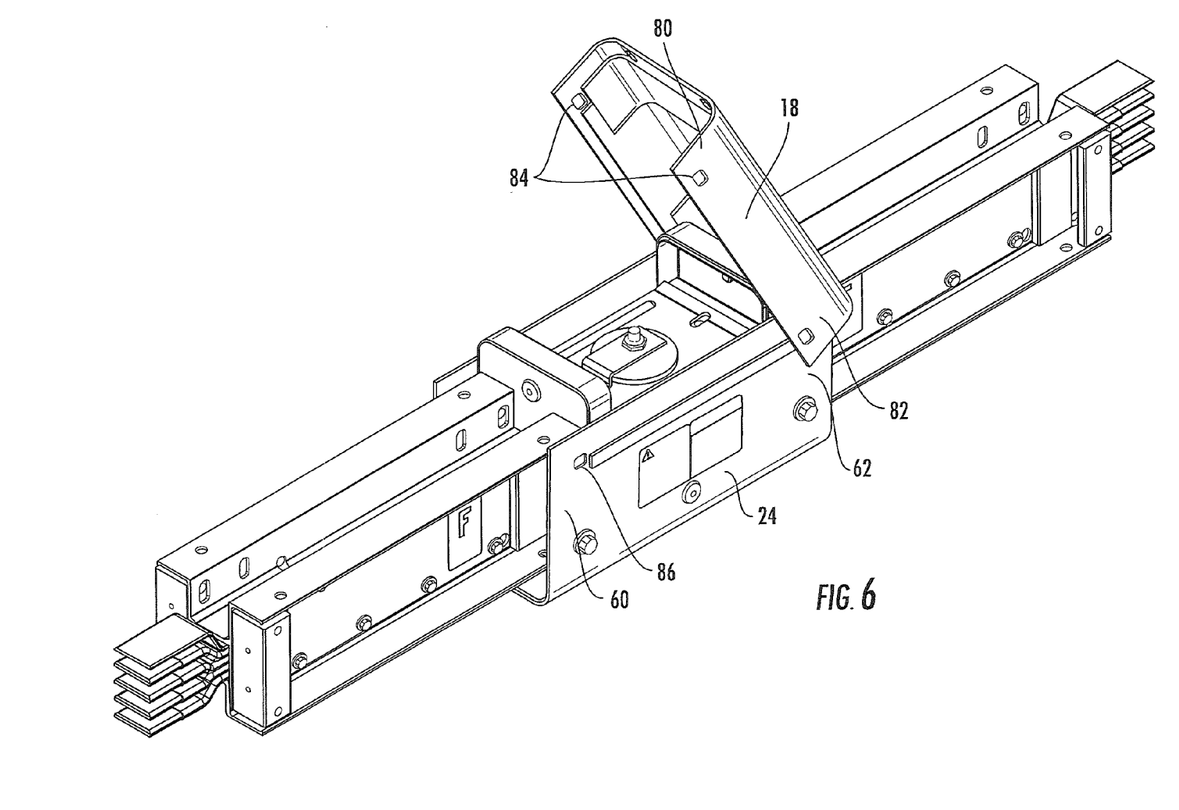
FIG. 6 is a perspective view illustrating the upper cover of FIG. 2 before being installed at a busway joint according to some embodiments of the invention.

In some embodiments, with the upper cover 12 and the lower cover 14 each in their first positions (e.g., FIG. 3), the upper cover 12 and the lower cover 14 are releasably attachable or connectable to one another. Referring to FIG. 6, each upper cover side wall 18 has first and second opposite end portions 80, 82, with each end portion including an aperture 84. Referring to FIGS. 5 and 6, each side portion 60, 62 of each lower cover side wall 24 includes a second aperture 86 (the apertures 86 are only visible on one side wall 24 in the FIGS. 5 and 6).

As the upper cover is moved to the first position, each aperture 84 of the upper cover side walls 18 aligns with a respective aperture 86 of the lower cover side walls 24. In addition, each aperture 84 of the upper cover side walls 18 and the aligned aperture 86 of the lower cover side walls 24 may be aligned with a respective aperture or passageway 88 of the first and second busway sections 4, 6 (or the end block 70 associated therewith) (FIG. 4). In this regard, the upper and lower covers 12, 14 may be attached or connected to one another and, in some embodiments, the upper and lower covers 12, 14 may be further attached or connected to the busway sections 4, 6 using, for example, fasteners 90 (FIG. 3).

Other configurations are contemplated. As just one example, the upper cover 12 may be connectable to the busway sections 4, 6 and the lower cover 14 may then be connectable to the upper cover 12 and/or the busway sections 4, 6.

Referring again to FIG. 2, the assembly 10 may include a plurality of spacers or supports 94. In the illustrated embodiment, eight supports 94 are employed. Each support 94 is disposed either between the upper cover top wall 16 and one of the busway sections 4, 6 or between the lower cover bottom wall 24 and one of the busway sections 4, 6. In some embodiments, and as partially illustrated, two of the supports 94 are disposed between the upper flanges 52 of the first busway section 4 and the top wall first end portion 32, two of the supports 94 are disposed between the upper flanges 52 of the second busway section 6 and the top wall second end portion 34, two of the supports 94 are disposed between the lower flanges 54 of the first busway section 4 and the bottom wall first end portion 40 (FIG. 2), and two of the supports 94 are disposed between the lower flanges 54 of the second busway section 6 and the bottom wall second end portion 42.

The supports 94 may be formed of any suitable material. In some embodiments, the supports 94 are polymeric and, in some embodiments, are molded.

As shown in FIG. 2, each of the supports 94 may include two passageways 96, 98. The supports 94 may be positioned such that one of the passageways 96, 98 is aligned with the pathways P1, P2 (FIG. 3). In some embodiments, and as illustrated, one of the passageways 96, 98 of each support 94 is aligned with either: 1) one of the apertures 36 of the first end portion 32 of the top wall 16 and the corresponding aperture 56 of an upper flange 52 (FIG. 4) of the first busway section 4; 2) one of the apertures 36 of the second end portion 34 of the top wall 16 and the corresponding aperture 56 of an upper flange 52 of the second busway section 6; 3) one of the apertures 44 of the first end portion 40 of the bottom wall 22 and the corresponding aperture 58 of a lower flange 54 of the first busway section 4; and 4) one of the apertures 44 of the second end portion 42 of the bottom wall 22 and the corresponding aperture 58 of a lower flange 54 of the second busway section 6.

In some embodiments, and as illustrated in FIG. 2, the supports 94 may be attached to the flanges 52, 54 (FIG. 4) of each of the first and second busway sections 4, 6. In some other embodiments, and as illustrated in FIG. 4, the supports 94 may be attached to the upper cover 12 and/or the lower cover 14. In still other embodiments, the supports 94 may be positioned after the upper cover 12 and/or the lower cover 14 are positioned relative to the busway sections 4, 6 (e.g., in their first positions). For example, the supports 94 may be slid into place before the elongated fasteners 30 are routed through the upper and lower covers 12, 14.

As noted above, each support 94 may include first and second spaced-apart passageways 96, 98. A technician may select one or the other of the passageways 96, 98 to form a portion of the pathways P1, P2. For example, the passageways 96, 98 may be threaded, with one of the passageways 96, 98 having right-handed threads and the other one of the passageways 96, 98 having left-handed threads. The elongated fasteners 30 extend through the pathways P1, P2 as will be described in more detail below. The elongated fasteners 30 may be threaded such that they threadingly engage the selected passageway 96, 98 of each support 94. Accordingly, the technician may select which passageways 96, 98 to align with the pathways P1, P2 depending on whether right-handed or left-handed operation (e.g., tightening) is desired. In some embodiments, the supports 94 may be rotated 180 degrees to select between the passageways 96, 98.

With the upper and lower covers 12, 14 in their respective first positions, each elongated fastener 30 is sized and configured to extend through the upper cover 12, through one of the first and second busway sections 4, 6, and to, toward or through the lower cover 14 (i.e., along or through one of the pathways P1, P2 as shown in FIG. 3). The elongated fasteners 30 may thereby securely join the upper and lower covers 12, 14 to the busway sections 4, 6.

The elongated fasteners 30 may provide structural stability and/or strength for the joint assembly 10 by extending in the direction of the applied stress. The pathways P1, P2 are elongated, and may extend through both covers 12, 14 and the entire "height" of the busway sections 4, 6, providing increased structural strength with the elongated fasteners 30 extending through the pathways P1, P2. Where used, the supports 94 can provided increased structural strength by allowing the fasteners 30 to urge (e.g., bolt) the covers 12, 14 directly to the busway sections 4, 6 in the direction of the applied stress. Where used, the rounded corners 20, 26 may reduce the incidence of stress concentration areas.

In some applications, the busway sections 4, 6 may be suspended and/or cantilevered such that stress is experienced at the end portions of the busway sections 4, 6. The elongated fasteners 30 may extend substantially vertically through the upper and lower covers 12, 14 and the busway sections 4, 6 such that the elongated fasteners 30 bolt the covers 12, 14 to the busway sections 4, 6 in the direction of the stress. Thus, the elongated fasteners 30 may be in shear as opposed to experiencing significant bending moments were the fasteners to be perpendicular to the stress, for example.

The upper and lower covers 12, 14 and/or the busway sections 4, 6 may be configured such that the upper and lower covers 12, 14 form a seal around the joint formed between the first and second busway sections 4, 6. For example, the barrier plates 72 of the busway sections 4, 6 (FIG. 4) may form a gasket or include gasket material attached thereto. Additionally or alternatively, one or both of the upper and lower covers 12, 14 may include a gasket material. For example, referring to FIG. 2, a gasket member 100 may be provided on the underside of the top wall 16 of the upper cover 12. Although not visible, a pair of gasket members 100 may be provided, with one each disposed at the first and second end portions 32, 34 of the top wall 16. The gasket member(s) 100 may sealingly engage the barrier plates 72 with the upper cover 12 in place. Similar gasket member(s) may be provided on the upper side of the bottom wall 22 of the lower cover 14.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A cover assembly for use with a joint between first and second busway sections, the assembly comprising:
a lower cover having a bottom wall including first and second end portions, each of the first and second end portions including a pair of spaced-apart fastener receiving features, the lower cover sized and configured to be positioned in a first position below the joint such that the first end portion of the bottom wall is positioned below a portion of the first busway section and the second end portion of the bottom wall is positioned below a portion of the second busway section;
an upper cover having a top wall including first and second end portions, each of the first and second end portions including a pair of spaced-apart apertures, the upper cover sized and configured to be positioned in a first position above the joint such that the first end portion of the top wall is positioned above a portion of the first busway section and the second end portion of the top wall is positioned above a portion of the second busway section, wherein, with the lower and upper covers in their respective first positions:
the apertures of the first end portion of the top wall are aligned with the fastener receiving features of the first end portion of the bottom wall, thereby forming first and second substantially vertical spaced-apart pathways that extend through the first busway section; and
the apertures of the second end portion of the top wall are aligned with the fastener receiving features of the second end portion of the bottom wall, thereby forming first and second substantially vertical spaced-apart pathways that extend through the second busway section; and
a plurality of elongated fasteners, each fastener sized and configured to extend through a respective one of the pathways with the upper and lower covers in their respective first positions so as to secure the upper and lower covers to the first and second busway sections.

2. The assembly of claim 1, wherein the upper and lower covers are releasably connectable to one another when in their first positions.

3. The assembly of claim 2, wherein each of the upper and lower covers includes a pair of opposed side walls, and wherein each side wall of the upper cover is releasably connectable with a respective side wall of the lower cover.

4. The assembly of claim 3, wherein the upper and lower covers form a seal around the joint when connected to one another.

5. The assembly of claim 3, wherein each side wall of the upper cover extends outwardly away from the top wall with a rounded corner therebetween, and wherein each side wall of the lower cover extends outwardly away from the bottom wall with a rounded corner therebetween.

6. The assembly of claim 1, further comprising a plurality of supports, each support including at least one passageway, each support sized and configured to be positioned adjacent one of the apertures of the upper cover top wall or one of the fastener receiving features of the lower cover bottom wall such that the at least one passageway forms a portion of a respective one of the pathways.

7. The assembly of claim 6, wherein the at least one passageway of each support is threaded, and wherein each elongated fastener is configured to threadingly engage the passageway.

8. The assembly of claim 6, wherein each support includes first and second spaced-apart passageways.

9. The assembly of claim 1, wherein each of the first and second busway sections includes a housing having first and second apertures, wherein, with the upper and lower covers in their respective first positions:
the first and second apertures of the first busway section housing align with the first and second pathways extending through the first busway section; and
the first and second apertures of the second busway section housing align with the first and second pathways extending through the second busway section.

10. A system comprising:
first and second busway sections forming a joint therebetween;
a joint cover comprising:
a first cover member having an end wall including first and second end portions, the first cover member positioned on a first side of the joint; and
a second cover member having an end wall including first and second end portions, the second cover member positioned on a second, opposite side of the joint; and
a plurality of elongated fasteners, one fastener extending through each of:
first and second pathways associated with the first busway section and formed through the first end portion of the first cover member, through the first busway section, and to the first end portion of the second cover member; and
first and second pathways associated with the second busway section and formed through the second end portion of the first cover member, through the second busway section, and to the second end portion of the second cover member;
wherein each of the first and second cover members includes a pair of side walls, and wherein the first and second cover members are connected at the side walls.

11. The system of claim 10, wherein:
the first pathway associated with the first busway section is defined by a first aperture of the first end portion of the first cover member, a first aperture of a housing of the first busway section, and a first fastener receiving feature of the first end portion of the second cover member;
the second pathway associated with the first busway section is defined by a second aperture of the first end portion of the first cover member, a second aperture of the housing of the first busway section, and a second fastener receiving feature of the first end portion of the second cover member;
the first pathway associated with the second busway section is defined by a first aperture of the second end portion of the first cover member, a first aperture of a housing of the second busway section, and a first fastener receiving feature of the second end portion of the second cover member; and
the second pathway associated with the second busway section is defined by a second aperture of the second end portion of the first cover member, a second aperture of the housing of the second busway section, and a second fastener receiving feature of the second end portion of the second cover member.

12. The system of claim 11, wherein the first and second cover members form a seal around the joint.

13. A system comprising:
first and second busway sections forming a joint therebetween;
a joint cover comprising:
an upper cover having a top wall including first and second end portions, the upper cover positioned above the joint such that the first end portion is positioned above the first busway section and the second end portion is positioned above the second busway section; and a lower cover having a bottom wall including first and second end portions, the lower cover positioned below the joint such that the first end portion is positioned below the first busway section and the second end portion is positioned below the second busway section; and a plurality of elongated fasteners, one fastener extending through each of:

first and second substantially vertical pathways associated with the first busway section and formed through the first end portion of the upper cover, through the first busway section, and to the first end portion of the lower cover; and first and second substantially vertical pathways associated with the second busway section and formed through the second end portion of the upper cover, through the second busway section, and to the second end portion of the lower cover.

14. The system of claim 13, wherein each of the first and second busway sections includes a housing, each housing including first and second substantially horizontal upper flanges and first and second substantially horizontal lower flanges, and wherein:

the first pathway associated with the first busway section extends through the first upper flange and the first lower flange of the first busway section housing;

the second pathway associated with the first busway section extends through the second upper flange and the second lower flange of the first busway section housing;

the first pathway associated with the second busway section extends through the first upper flange and the first lower flange of the second busway section housing;

the second pathway associated with the second busway section extends through the second upper flange and the second lower flange of the second busway section housing.

15. The system of claim 14, wherein:

the first pathway associated with the first busway section is defined by aligned apertures in the first end portion of the top wall, the first upper flange and the first lower flange;

the second pathway associated with the first busway section is defined by aligned apertures in the first end portion of the top wall, the second upper flange and the second lower flange;

the first pathway associated with the second busway section is defined by aligned apertures in the second end portion of the top wall, the first upper flange and the first lower flange; and the second pathway associated with the second busway section is defined by aligned apertures in the second end portion of the top wall, the second upper flange and the second lower flange.

16. The system of claim 15, wherein the first and second pathways associated with the first busway section are further defined by respective fastener receiving features in the first end portion of the bottom wall, and wherein the first and second pathways associated the second busway section are further defined by respective fastener receiving features in the second end portion of the bottom wall.

17. The system of claim 16, wherein the fastener receiving features in the bottom wall are apertures.

18. The system of claim 14, further comprising a plurality of supports, one positioned between each of the upper flanges and the top wall and one positioned between each of the lower flanges and the bottom wall, each of the supports including at least one passageway such that each pathway includes a passageway of two of the supports.

19. The system of claim 18, wherein each of the supports includes first and second spaced-apart passageways, the first passageway having right-handed threads and the second passageway having left-handed threads, and wherein each of the elongated fasteners threadingly engages one of the first or second passageways of two of the spacers as it extends through a respective pathway.

20. The system of claim 13, wherein each of the upper and lower covers includes a pair of opposed side walls, wherein the side walls of at least one of the upper and lower covers is releasably connected to the first and second busway sections, and wherein the side walls of the upper and lower covers are releasably connected to one another.

21. The system of claim 20, wherein the side walls of at least one of the upper and lower covers are releasably connected to opposing sides of the first and second busway sections, and wherein at least a portion of the side walls of one of the upper and lower covers overlie at least a portion of the side walls of the other one of the upper and lower covers.

* * * * *